(12) United States Patent
Akuzawa et al.

(10) Patent No.: US 8,603,607 B2
(45) Date of Patent: Dec. 10, 2013

(54) VEHICLE INTERIOR MEMBER

(75) Inventors: Mitsuhiro Akuzawa, Tokyo (JP); Masae Yamanaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/096,296

(22) Filed: Apr. 28, 2011

(65) Prior Publication Data

US 2011/0287230 A1    Nov. 24, 2011

(30) Foreign Application Priority Data

May 18, 2010 (JP) .................................. 2010-114534

(51) Int. Cl.
*B32B 3/00* (2006.01)
*B60R 13/00* (2006.01)

(52) U.S. Cl.
USPC ............... 428/156; 428/31; 428/141; 428/161

(58) Field of Classification Search
USPC ........... 428/31, 156, 158, 161, 162, 163, 141, 428/172
See application file for complete search history.

(56) References Cited

U.S. PATENT DOCUMENTS 5,242,738 A * 9/1993 Furuya et al. ................. 428/172

FOREIGN PATENT DOCUMENTS

| JP | 2007-522297 A | | 8/2007 |
|---|---|---|---|
| JP | 2009-39153 A | | 2/2009 |
| JP | 2009039153 A | * | 2/2009 |
| WO | 2005/078023 A2 | | 8/2005 |

* cited by examiner

*Primary Examiner* — Catherine A Simone
(74) *Attorney, Agent, or Firm* — McDermott Will & Emery LLP

(57) ABSTRACT

A covering material of an instrument panel includes an infrared reflecting layer, which is a lower layer, and a design layer, which is an upper layer. The design layer is applied to the infrared reflecting layer and has a small thickness. An undulating pattern is formed on the outer surface of the infrared reflecting layer. The design layer has a small thickness, so that an undulating pattern that is similar to that of the infrared reflecting layer is formed on the design layer. The design layer contains a black pigment that is transmissive to infrared radiation. Incident infrared radiation passes through the design layer, is reflected by the infrared reflecting layer, and is diffused.

2 Claims, 2 Drawing Sheets

VEHICLE INTERIOR MEMBER

CROSS-REFERENCE TO RELATED APPLICATIONS

The present invention claim priority from Japanese Patent Application No. 2010-114534 filed on May 18, 2010, the entire contents of which are hereby incorporated by reference.

BACKGROUND OF THE INVENTION

1. Field of the Invention

The present invention relates to a vehicle interior member that includes a covering material, having a double-layer structure including a lower layer that reflects infrared radiation and an upper layer that allows infrared radiation to pass therethrough.

2. Description of the Related Art

Existing vehicle interior members, such as an instrument panel, include a cushioning material that is disposed between a core material and a covering material, in order to provide a soft texture. The core material is made of a rigid resin or the like. The cushioning material is made of a polyurethane foam, a polystyrene foam, a foamed polyethylene, or the like. The covering material is made of a soft resin such as a polyvinyl chloride and a polyurethane. The covering material is usually dark colored, such as black, to make dirt inconspicuous and to improve the design. The surface of the covering material is textured by transferring an undulating pattern, such as a leather pattern and a geometric pattern, thereonto so as to provide the surface with a good design and a texture.

Carbon black is a known example of a pigment that gives the covering material a dark color. However, carbon black is easily heated by absorbing infrared radiation. When sunlight falls on the surface of the covering material during daytime even in the case of parking for just a short time, the temperature of the surface rises and heat radiation from the surface increases the cabin temperature. Therefore, when a passenger enters a vehicle after the vehicle has been parked for a long time in scorching sunlight in midsummer, the passenger feels discomfort, due to such high cabin temperature.

To prevent this, a substance that reflects infrared radiation may be mixed into the covering material in order to reduce absorption of infrared radiation. Metal oxides, such as a chromium oxide ($Cr_2O_3$) and a titanium oxide ($TiO_2$), are known examples of a substance that reflects infrared radiation. However, such a metal oxide is white and significantly reflects light. Therefore, if such a metal oxide is used, for example, for a covering material of an instrument panel, an image of the instrument panel is reflected by the windshield, so that visibility during driving may be obstructed and light reflected by the covering material may dazzle a passenger.

To prevent this, Japanese Unexamined Patent Application Publication No. 2009-39153, for example, describes a technology related to a covering material, having a double-layer structure including a lower layer and an upper layer. The lower layer is made of a material containing a metal oxide, so that the lower layer serves as an infrared reflecting layer. The upper layer is made of a material containing a black pigment that is transmissive to infrared radiation, so that the upper layer allows infrared radiation to pass therethrough. Accordingly, infrared radiation that has passed through the upper layer is reflected by the lower layer, whereby absorption of infrared radiation is reduced.

With the technology described in Japanese Unexamined Patent Application Publication No. 2009-39153, the material of the upper layer contains a black pigment that is transmissive to infrared radiation. Therefore, the surface of the upper layer is dark colored, has a good design, and does not substantially reflect light. As a result, if an instrument panel has such an upper layer, an image is not substantially reflected by the windshield, so that visibility for a driver is not obstructed and a passenger is not dazzled.

However, with the technology described in Japanese Unexamined Patient Application Publication No. 2009-39153, the outer surface of the upper layer is textured and it is necessary that the upper layer has a thickness that is at least larger than the depths of depressed portions of the textured pattern. Therefore, the thickness of the covering material having the double-layer structure becomes large. If, for example, a cushioning material for the instrument panel is formed so as to have a conventional shape, the overall size of the instrument panel becomes large.

Moreover, because the textured pattern is usually formed on the surface of the upper layer by using shaping dies, it is necessary to form each of the lower layer and the upper layer of the covering material by using shaping dies, which makes the manufacturing process complex and increases the product cost.

SUMMARY OF THE INVENTION

An object of the present invention, which addresses the problems described above, is to provide a vehicle interior member that includes a covering material having a double-layer structure including a lower layer that reflects infrared radiation and an upper layer that allows infrared radiation to pass therethrough. The double layer structure can be made by a simple manufacturing process and the lower layer can be formed by using existing shaping dies, so chat the vehicle interior member can be made without significantly increasing manufacturing cost.

In order to achieve the above object, according to an aspect of the present invention, a vehicle interior member includes a core material that forms a basic shape of the interior member; and a covering material that covers the core material and forms an outer shape of the interior member, the covering material having a double-layer structure including a lower layer that contains a substance that reflects infrared radiation, and an upper layer applied to the outer surface of the lower layer, the upper layer containing a black pigment that allows the infrared radiation to pass therethrough, wherein an undulating pattern is formed on the outer surface of the lower layer, and the upper layer is applied such chat the upper layer takes the shape of the undulating pattern.

With the present invention, although the covering material has a double-layer structure, which includes a lower layer that reflects infrared radiation and an upper layer that allows infrared radiation to pass therethrough, shaping dies for forming the upper layer are not necessary because the upper layer is formed by applying the upper layer to the outer surface of the lower layer. Moreover, the lower layer can be made by using existing shaping dies. Therefore, it is sufficient that only the step of applying the upper layer be added to an existing manufacturing process, so that the manufacturing process does not become complex. Moreover, because the lower layer can be made by using shaping dies for forming existing covering materials, the vehicle interior member can be made without significantly increasing manufacturing cost.

DESCRIPTION OF THE PREFERRED EMBODIMENTS

Hereinafter, an embodiment of the present invention will be described with reference to the drawings. In the present embodiment, a vehicle interior member is used as an instrument panel.

Figure 1:
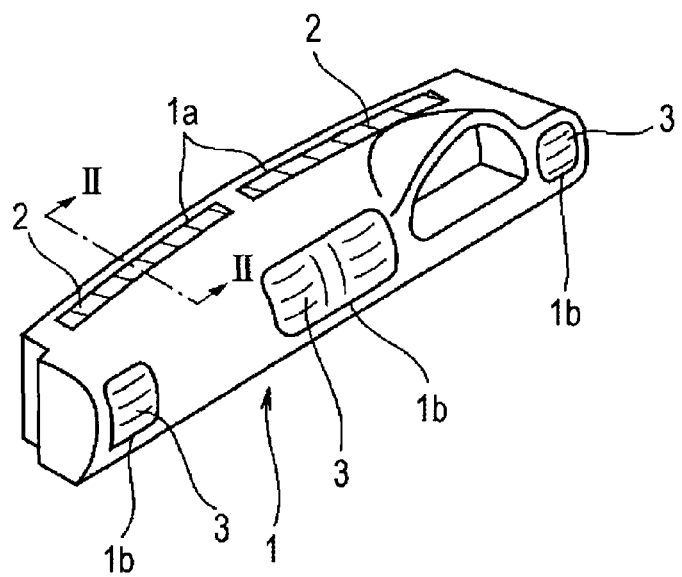
FIG. 1 is a perspective view of an instrument panel.
Figure 2:
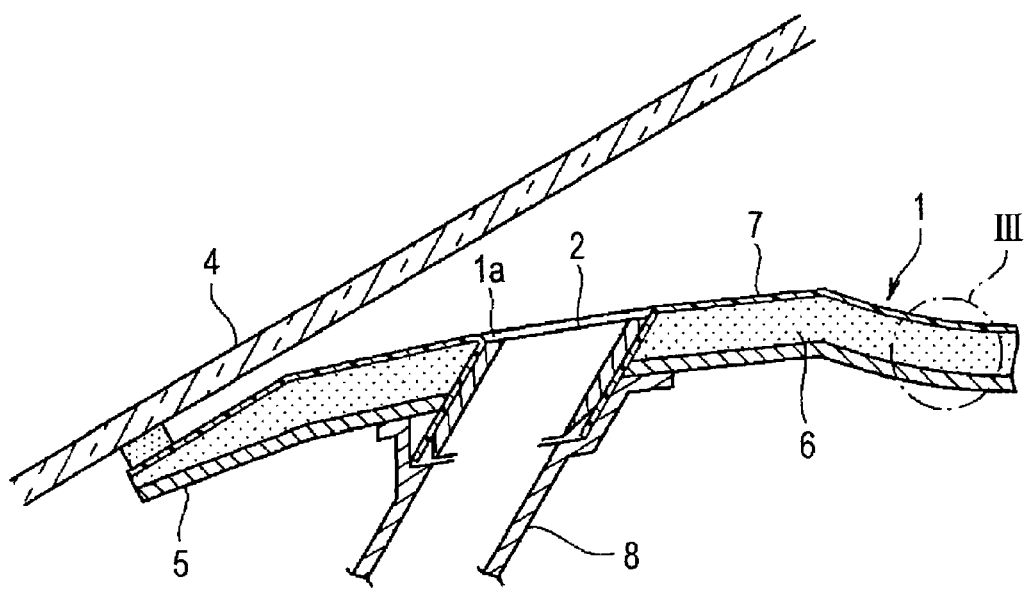
FIG. 2 is a sectional view taken along line II-II of FIG. 1.

Referring to FIGS. 1 and 2, an instrument panel 1 is disposed behind a windshield 4 and in front of front seats in a cabin. A plurality of vents, such as front defroster vents 1a and air conditioner vents 1b, are formed in the instrument panel 1. The front defroster vents 1a are covered by front defroster grilles 2, and the air conditioner vents 1b are covered by ventilation grilles 3.

Referring to FIG. 2, the instrument panel 1 includes a frame 5, a cushioning material 6, and a covering material 7. The frame 5, which corresponds to a core material, is made of a rigid resin. The cushioning material 6 covers the frame 5. The covering material 7 covers the outer surface of the cushioning material 6. The frame 5, which has a predetermined shape, forms the basic shape of the instrument panel 1. The covering material 7, which covers the frame 5 with the cushioning material 6 therebetween, forms the outer shape of the instrument panel 1.

Figure 3:
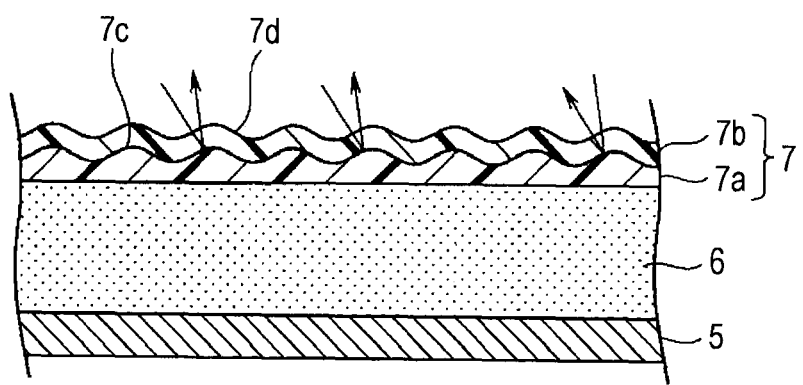
FIG. 3 is an enlarged view of a region III of FIG. 2.

Referring to FIG. 3, the covering material 7 has a double-layer structure including an infrared reflecting layer 7a and a design layer 7b. The infrared reflecting layer 7a, which corresponds to a lower layer, covers the outer surface of the cushioning material 6. The design layer 7b, which corresponds to an upper layer, is applied to the surface of the infrared reflecting layer 7a. The cushioning material 6 is made of a foamed material, such as a polyurethane foam, a polystyrene foam, and a foamed polyethylene. When foam-molding the cushioning material 6 by using shaping dies, the frame 5 and the infrared reflecting layer 7a are set in the cavity of the shaping dies and are insert molded.

The infrared reflecting layer 7a of the covering material 7 is made by mixing fine particles of an infrared reflecting material into a soft resin material, such as a soft polyvinyl chloride and a soft polypropylene, and by injection-molding the mixed material by using shaping dies or the like. When forming the infrared reflecting layer 7a, an undulating pattern 7c, such as a leather pattern and a geometric pattern having a depth in the range of about 30 to 40 μm, is transferred onto the outer surface of the infrared reflecting layer 7a. Metal oxides such as a chromium oxide ($Cr_2O_3$) and a titanium oxide ($TiO_2$) are known examples of such an infrared reflecting material. In the present embodiment, the infrared reflecting layer 7a is made from a mixture of such a resin material and fine particles of such a metal oxide with a proportion in the range of 10 to 15 percent.

The design layer 7b is formed by applying a paint, which is made of a transparent soft resin containing a black organic pigment that is transmissive to infrared radiation, to the infrared reflecting layer 7a, which has been foam-molded, by using a spray gun or the like. A known example of a black organic pigment that is transmissive to infrared radiation is a perylene pigment that is described in Japanese Unexamined Patent Application Publication (Translation of PCT Application) 2007-522297.

The thickness of the design layer 7b is as thins as in the range of about 10 to 30 μm. Therefore, referring to FIG. 3, the design layer 7b is applied so the outer surface of the infrared reflecting layer 7a such that the design layer 7b takes the shape of the undulating pattern 7c formed on the outer surface of the infrared reflecting layer 7a. To simplify illustration, the thickness of the design layer 7b is exaggerated in FIG. 3.

As described above, the thickness of the design layer 7b (in the range of about 10 to 30 μm) is smaller than the depth (in the range of about 30 to 40 μm) of the undulating pattern 7c formed on the outer surface of the infrared reflecting layer 7a. Therefore, the design layer 7b does not completely conceal the undulating pattern 7c formed on the outer surface of the infrared reflecting layer 7a, so that the design layer 7b takes the shape of the undulating pattern 7c. As a result, an undulating pattern 7d that is substantially the same as the undulating pattern 7c is formed on the surface of the design layer 7b.

The outer surface of the instrument panel 1 is black, because the design layer 7b contains a black pigment. Moreover, the infrared reflecting layer 7a, which is covered by the design layer 7b, cannot be seen from the outside. Therefore, the instrument panel 1 has a good outward appearance. Referring to FIG. 2, a nozzle 8, which extends from an air duct (not shown), is connected to the front defroster grille 2.

In the instrument panel 1 having such a structure, the design layer 1b of the covering material 7 is applied by using a spray gun or the like. Therefore, it is sufficient that only the step of forming the design layer 7b be added to an existing manufacturing process, so that the manufacturing process does not become complex. Moreover, the infrared reflecting layer 7a can be formed by using shaping dies for forming existing covering materials, so that additional equipment investment is not necessary and the manufacturing process is cost efficient.

Furthermore, the thickness of the design layer 7b is in the range of 10 to 30 μm, which is small, so that the size of the instrument panel 1 is not substantially increased when the design layer 7b is applied to the infrared reflecting layer 7a. Moreover, the undulating pattern 7c, which has been formed on the infrared reflecting layer 7a, can be directly used as the undulating pattern 7d on the outer surface of the instrument panel. Therefore, the frame 5, the cushioning material 6, and the infrared reflecting layer 7a of the covering material 7 can be formed by existing processes, so that the instrument panel 1 is manufactured easily. Because additional shaping dies are not necessary, equipment cost is low, and the product cost can be reduced. The undulating pattern 7d on the design layer 7b is formed by only applying a paint, so that the manufacturing operation can be simplified. The materials of both of the infrared reflecting layer 7a and the design layer 7b are soft resins, so that the texture the same as those of exiting instrument panels can be obtained.

Referring to FIG. 3, when a vehicle having the instrument panel 1 is parked in scorching sunlight, the infrared component of the sunlight, which is incident on the instrument panel 1 through the windshield 4, passes through the design layer 7b on the surface of the instrument panel 1 without being absorbed, and is incident on the infrared reflecting layer 7a.

The infrared radiation that is incident on the infrared reflecting layer 7a is reflected by the infrared reflecting layer 7a, passes through the design layer 7b again, and is diffused to the outside. As a result, although the instrument panel 1 has a black surface, the covering material 7 does not considerably absorb infrared radiation, so that heat due to infrared radiation is not accumulated in the cushioning material 6, whereby an increase in the temperature of the surface of the instrument panel 1 is suppressed.

As a result, discomfort for a passenger when the passenger enters a vehicle that has been parked in scorching sunlight is eased, because the surface of the instrument panel 1 reflects infrared radiation no shield heat and suppresses an increase in the temperature of the passenger cabin. Moreover, a load for the air conditioner is reduced due to the heat shielding effect, so that the fuel economy is improved.

The present invention is not limited to the embodiment described above. Besides the instrument panel 1, for example, the vehicle interior member can be applied to a door trim, a rear shelf, an arm rest, or a sun visor. In such cases, the cushioning material 6 may be omitted, and the covering material 7 may directly cover the frame 5. The infrared reflecting layer 7*a*, the cushioning material 6, and the frame 5 may be integrally formed as an infrared reflecting layer, and the design layer 7*b* may be applied to the surface of the infrared reflecting layer.

The material of the infrared reflecting layer 7*a* may contain, in addition to the above-described fine particles of a metal oxide, fine particles of a black pigment, which is dark-colored and does not substantially absorb infrared radiation, in order to reduce the brightness. In this case, for example, even if the design layer 7*b* wears and becomes thinner over time and the infrared reflecting layer 7*a* becomes seen from the outside, such a thinned portion can be made inconspicuous.

What is claimed is:

1. A vehicle interior member comprising:
   a core material that forms a basic shape of the interior member; and
   a covering material that covers the core material and forms an outer shape of the interior member, the covering material having a double-layer structure including
      a lower layer that contains a substance that reflects infrared radiation, and
      an upper painted layer that is formed over the outer surface of the lower layer, the upper painted layer containing a black pigment that allows the infrared radiation to pass therethrough, wherein
   the outer surface of the lower layer has an undulating pattern,
   the upper painted layer is formed over the outer surface of the lower layer along the undulating pattern of the outer surface,
   the undulating pattern has a depth in the range of 30 to 40 micrometers, and
   the upper painted layer has a thickness in the range of 10 to 30 micrometers.

2. The vehicle interior member according to claim 1, wherein a cushioning material is disposed between the core material and the lower layer.

* * * * *